W. H. HARDING & C. M. SAEGER.
FUEL FEEDER.
APPLICATION FILED AUG. 8, 1908.
940,313.
Patented Nov. 16, 1909.
3 SHEETS—SHEET 1.
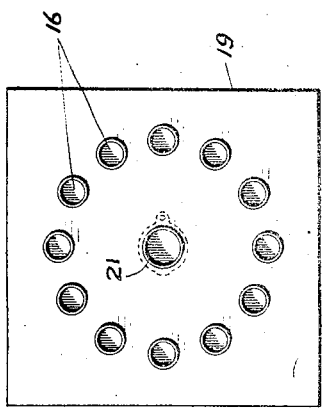
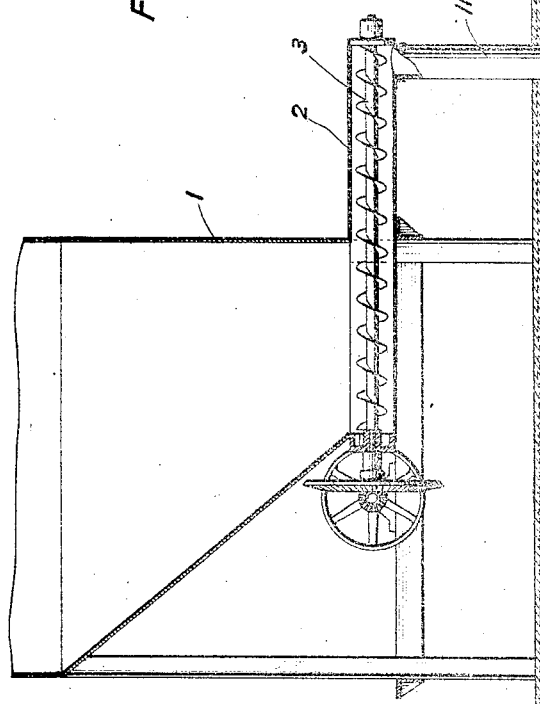
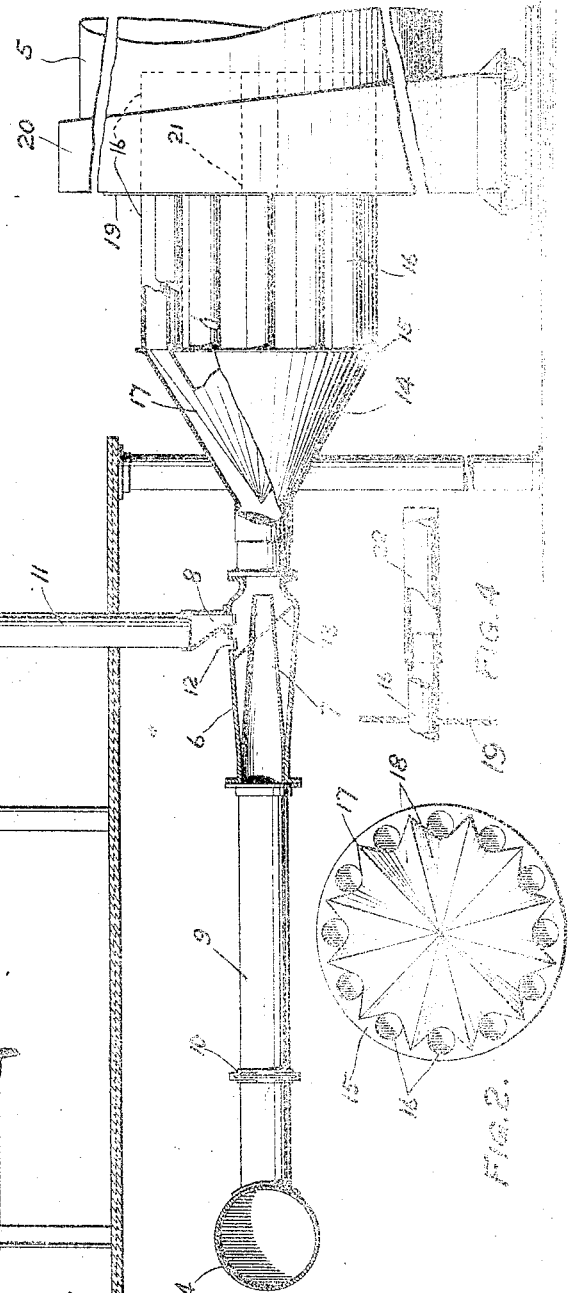
WITNESSES:
INVENTORS
William H. Harding
Charles M. Saeger
by Augustus B. Stoughton
ATTORNEY.

W. H. HARDING & C. M. SAEGER.
FUEL FEEDER.
APPLICATION FILED AUG. 8, 1908.
Patented Nov. 16, 1909.
3 SHEETS—SHEET 3.
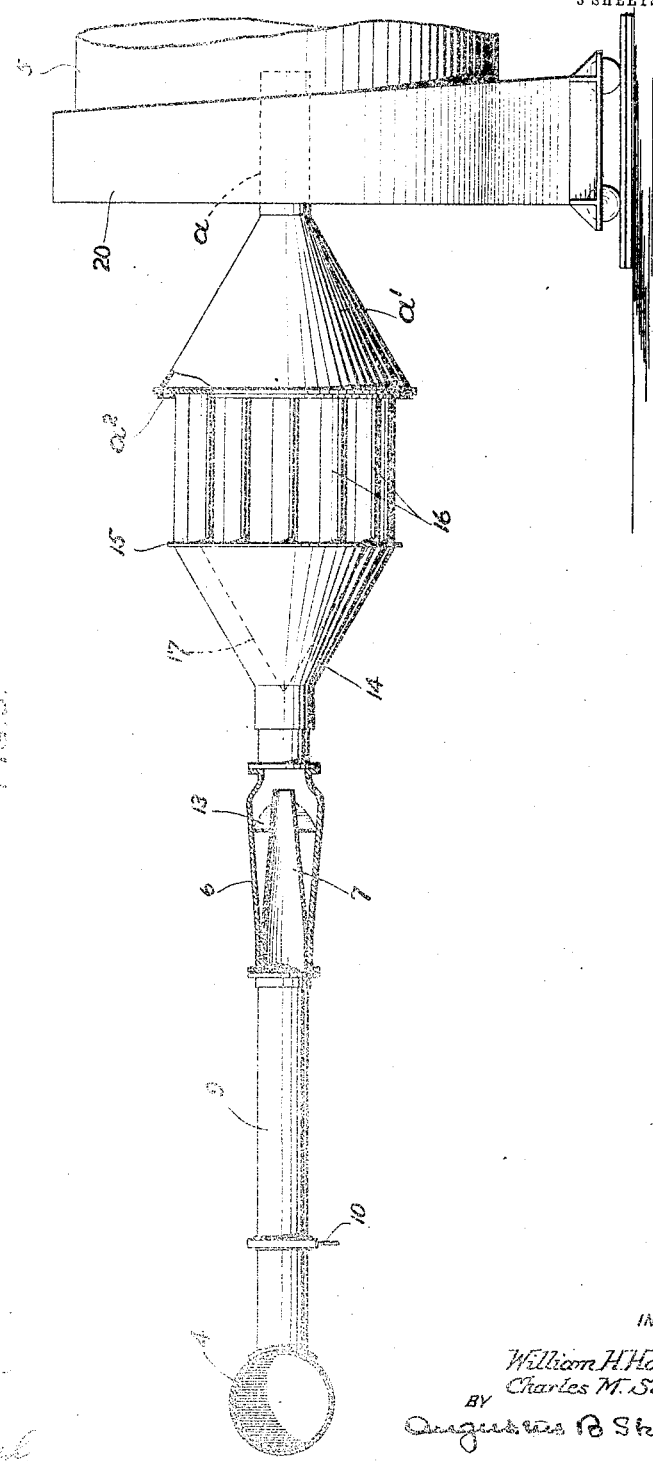
INVENTORS
William H. Harding,
Charles M. Saeger
BY Augustus B. Stoughton
ATTORNEY.

UNITED STATES PATENT OFFICE.

WILLIAM H. HARDING, OF PHILADELPHIA, AND CHARLES M. SAEGER, OF ALLENTOWN, PENNSYLVANIA.

FUEL-FEEDER.

940,313.  Specification of Letters Patent.  Patented Nov. 16, 1909.

Application filed August 8, 1908. Serial No. 447,636.

*To all whom it may concern:*

Be it known that we, WILLIAM H. HARDING, a citizen of the United States, residing at Philadelphia, in the county of Philadelphia and State of Pennsylvania, and CHARLES M. SAEGER, a citizen of the United States, residing at Allentown, in the county of Lehigh and State of Pennsylvania, have jointly invented certain new and useful Improvements in Fuel-Feeders, of which the following is a specification.

Objects of the present invention are to provide for economically burning pulverized fuel, as coal, for example, in rotary cement kilns, boilers and other furnaces, and to distribute the particles of powdered fuel and thereby promote rapid ignition and complete combustion of all of them.

Figure 5:
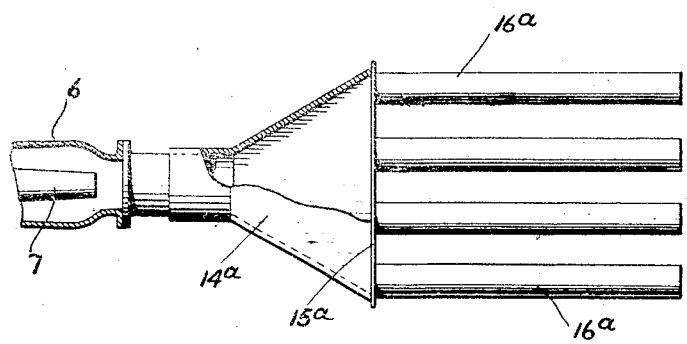
Figure 6:
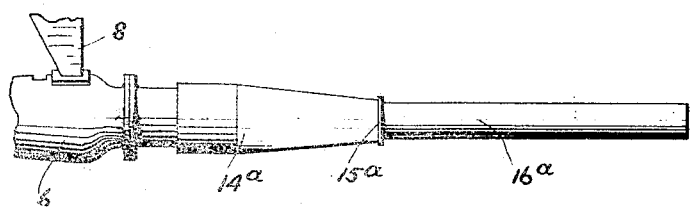
Figure 7:
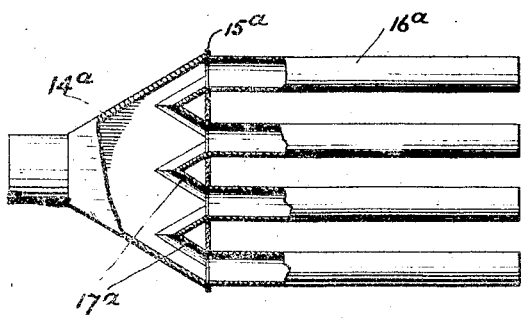
Figure 8:
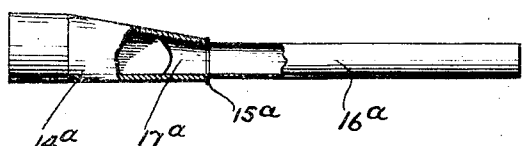

In order to describe the invention reference will be made to the accompanying explanatory drawings showing embodiments, but not the only embodiments or applications of the invention, and in those drawings Figure 1, is a view principally in central section illustrating a fuel feeder embodying features of the invention and showing in connection therewith portions of a rotary cement kiln. Fig. 2, is an end view, looking toward the right, of the spreader shown in Fig. 1, with the casing removed. Fig. 3, is a view looking toward the left of the plate shown in Fig. 1. Fig. 4, is a side view illustrating a detail of construction that may be resorted to. Figs. 5 and 6, are respectively a plan view with parts broken away and a side view of a burner embodying a modification of the invention. Figs. 7 and 8, are similar views with parts broken away of a device embodying another modification of the invention, and Fig. 9, is a side view, partly in section, showing another modification of the invention.

For the sake of explanation the invention will be described in application to a rotary cement kiln, although it must be borne in mind that it is applicable to other uses.

In the drawings 1, is a hopper from which powdered coal, or like fuel, is fed. It is provided with a feed extension 2, fitted with a rotary feed device or screw 3. 4, is an air supply pipe, trunk or main. 5, is a rotary kiln which is fitted at one end with an offtake for the products of combustion and an intake for the cement mixture, and at the other end with an outlet for the burned cement mixture. These parts are well understood and do not need particular or further description.

Referring to the fuel feeder, 6 is a casing provided with an air discharge nozzle 7, and in rear of the discharge end of the nozzle with a fuel feed inlet 8. The nozzle 7, communicates with the air pipe 4, by means of a pipe 9, which may be provided with a valve or gate 10. The fuel inlet 8, receives the fuel from the hopper 1, by way of a pipe 11. It has been said that the discharge end of the nozzle 7, is arranged in advance of the fuel inlet 8, so that an air jet issuing from the nozzle draws the powdered fuel forward and carries it from the casing 6.

The casing may be provided with a hand hole and cover 12, and with an inclined partition 13. Connected with the discharge side of the casing 6, is a conical or flaring shell 14, terminating in a plate or head 15. As shown in Fig. 1, the casing 14 is of the form of a frustum of a cone. As shown in Figs. 5 to 8, the shell $14^a$, is flaring, but is generally rectangular in cross-section, so that the form of the shell may be varied. From the plate 15, projects a series of straight tubes 16, thus in Figs. 1, 2, and 9, the group of tubes is arranged in a circle, whereas in Figs. 5 to 8, the tubes $16^a$, are arranged in a straight row or common plane and project from the plate or head $15^a$. The stream consisting of a mixture of powdered fuel and air in traversing the casing and tubes is thoroughly mixed and subdivided and thus the particles of fuel are diffused or thoroughly mixed with the air and all of them are well supplied with air whereby they are all rapidly ignited and their combustion is made complete. Within the casing 14, there is shown a cone, pyramid or spreader 17, the wall of which is provided with grooves 18, corresponding in number with the tubes 16.

In Figs. 7 and 8, $17^a$, is the spreader and consists of vertical partitions, and in Fig. 5, there is no spreader, but the plate or head $15^a$, serves to subdivide the mixture of powdered fuel and air and permit the subdivisions to pass to the various tubes. The number of tubes is not an important feature of the invention and while twelve tubes are shown in Fig. 2, the number may be increased or diminished. The tubes project through a plate 19, carried by the hood 20, and this plate may be, if desired, faced with asbestos. 21, is an opening which is provided with a movable lid, shown in dotted lines in Fig. 3, adapted to wholly or partly cover it and which may be formed through the plate 19 and through which air may be permitted to enter in the midst of the group of tubes. The ends of the tubes Fig. 4 are shown as fitted with sleeves 22, which may be removed and replaced by others in case they should be burned or otherwise injuriously affected by heat. The grooved cone, pyramid, or spreader, when present, facilitates the breaking up of the jet of mixed air and fuel issuing from the casing 6, and perfects the mixture of air and powdered coal or other fuel, and assists in directing the same to and through the tubes 16.

In Fig. 9, $a$, is a tube having a flaring end $a^1$, which receives the thorough mixture of air and fuel discharged from the group of tubes. This tube $a$, when present affords means for concentrating the mixture and directing the flame into impingement upon the material. The edge of the end $a^1$, may be perforated and have applied to it a perforated movable ring, thus making a register-like arrangement having openings $a^2$, for air which openings may be made larger or smaller.

In use the jet issuing from the nozzle 7, may be of comparatively low pressure, such as seven ounces, and since it is discharged in advance of the fuel inlet 8, it sucks the fuel forward. The stream consisting of a mixture of air and fuel is thoroughly mixed and sub-divided and the subdivisions are projected from the discharge ends of the various tubes 16, either directly into, for example, the body of a rotary kiln 5, [where the mixture of fuel and air issuing from each of the tubes is burned, additional air, if necessary, being supplied by way of the opening 21,] or into the tube $a$, from which they issue and are burned. The result of the subdivision of the mixture of air and fuel is to distribute or diffuse the fuel so that all the particles are quickly ignited and burned. The separate jets each present a comparatively small cool cone or space of poor combustion near the root, and in the aggregate these cool cones or spaces of poor combustion are negligible. The effective heat per unit of fuel consumption is increased by reason of the described subdivision and separate burning of the subdivisions. For example in burning cement by means of the described burner, from 75 to 80 pounds of powdered fuel are required per barrel instead of from 115 to 120 pounds per barrel, which are required with burners in which the mixture of coal and air is not sub-divided prior to injection and burning.

The tubes as has been said, are straight and their axes are parallel with the axis of the casing 6, and nozzle 7, or otherwise expressed, with the direction of motion of the stream consisting of a mixture of air and powdered fuel which they receive in subdivided condition.

What we claim is,

1. A fuel feeder provided with means for establishing a stream consisting of a mixture of air and powdered fuel and with a plurality of straight tubes and having, intermediate of the tubes and means, an expanded mixing chamber communicating with the tubes and means, and the axes of the tubes being parallel with each other and with the axis of the means, whereby the air and fuel in traversing the feeder are thoroughly mixed and are discharged in lines parallel with the axis of the means for forming the stream of the air and fuel mixture.

2. A fuel feeder provided with means for establishing a stream consisting of a mixture of air and powdered fuel and with a plurality of straight tubes and having, intermediate of the tubes and means, an expanded mixing chamber communicating with the tubes and means, said chamber provided with means for sub-dividing the stream and the axes of the tubes being parallel with each other and with the axis of the means, whereby the mixture is discharged in lines parallel with the axis of the means for forming the stream of the air and fuel mixture, substantially as described.

3. A fuel feeder comprising a casing provided with an inlet for powdered fuel and with an air nozzle terminating in advance of the inlet, a conical shell having a head and communicating at its apex with the discharge end of the casing and provided internally with a cone or pyramid having grooves or passages in its wall, and a series of tubes projecting from the head of the shell near the periphery and alined with the grooves, substantially as described.

4. A fuel feeder comprising a casing provided with an inlet for powdered fuel and with an air nozzle terminating in advance of the inlet, a conical shell having a head and communicating at its apex with the discharge end of the casing and provided internally with a conical or pyramidical deflector having grooves or passages in its wall, a series of tubes projecting from the head of the shell near its periphery and alined with the grooves in the deflector, and a hood plate through which the tubes pass and which is provided with an air opening, substantially as described.

5. In apparatus of the type recited the combination of a casing provided with a fuel inlet and an air nozzle, a pair of outwardly flaring shells between which the mixture of air and fuel passes, and a series of straight tubes projecting from said shells parallel with the axes thereof and through which the mixture is discharged, substantially as described.

6. In apparatus of the type recited the combination with the series of straight tubes of a pair of flaring shells arranged one within the other and which serve to direct the mixture to the tubes, substantially as described.

7. A fuel feeder comprising a flaring shell terminating in a head or plate and adapted to receive a mixture of air and powdered fuel, and straight burner tubes arranged parallel with each other and projecting from the head or plate in line with the axis of the shell and adapted to receive sub-divisions of the mixture, substantially as described.

8. A fuel feeder comprising a flaring shell adapted to receive a stream of powdered fuel and air and provided with separate straight burner tubes arranged parallel with each other and with the axis of the shell, and a spreader arranged in the shell for directing sub-divisions of the mixture to the respective tubes, substantially as described.

9. A fuel feeder comprising a casing provided with an inlet for powdered fuel and with an air nozzle, a conical shell communicating at its smaller end with the discharge end of the casing and having a head at its other end, a cone arranged in said shell with its apex toward the inlet end and having grooves or passages in its wall, a series of tubes projecting from said head and through which fuel from the shell passes, and a discharge tube having a flaring end provided with a head which receives said tubes, substantially as described.

In testimony whereof we have hereunto signed our names in the presence of witnesses.

WILLIAM H. HARDING.
CHARLES M. SAEGER.

Witnesses:
JOHN B. PATTON,
JOHN B. PATTON, Jr.,
FRANK E. FRENCH.